US006986341B2

(12) United States Patent
Mitani et al.

(10) Patent No.: US 6,986,341 B2
(45) Date of Patent: Jan. 17, 2006

(54) APPARATUS FOR DETECTING FUEL-VAPOR GAS LEAKS, AND VENT VALVE APPARATUS APPLIED TO THIS APPARATUS

(75) Inventors: Tateki Mitani, Chiyoda-Ku (JP); Seiji Tsutsui, Chiyoda-Ku (JP); Shigeki Kanamaru, Chiyoda-Ku (JP); Hiroshi Yoshioka, Chiyoda-Ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/706,089

(22) Filed: Nov. 13, 2003

(65) Prior Publication Data

US 2004/0200460 A1 Oct. 14, 2004

(30) Foreign Application Priority Data

Mar. 10, 2003 (JP) ...................................... 2003-063112

(51) Int. Cl.
*F02M 37/00* (2006.01)
*B60K 15/035* (2006.01)

(52) U.S. Cl. ....................... 123/520; 123/516; 123/518; 123/198 D; 73/49.7; 73/118.1; 137/596.17; 137/625.26; 251/129.03; 251/129.19

(58) Field of Classification Search ................. 123/516, 123/518–520, 198 D; 73/118.1, 40, 49.2, 73/49.7; 137/389, 596.17, 625.26, 625.65; 251/129.03, 129.19

See application file for complete search history.

(56) References Cited

U.S. PATENT DOCUMENTS

| | | | | | |
|---|---|---|---|---|---|
| 5,313,978 | A | * | 5/1994 | Takaki et al. | 137/43 |
| 5,809,976 | A | * | 9/1998 | Cook et al. | 123/516 |
| 6,053,151 | A | * | 4/2000 | Cook et al. | 123/520 |
| 6,112,728 | A | | 9/2000 | Schwegler et al. | |
| 6,422,255 | B1 | * | 7/2002 | Hartke et al. | 137/12 |
| 6,450,152 | B1 | * | 9/2002 | Everingham | 123/516 |
| 6,626,156 | B2 | * | 9/2003 | Rosseel | 123/516 |
| 2004/0040547 | A1 | * | 3/2004 | Ivens et al. | 123/520 |

FOREIGN PATENT DOCUMENTS

JP 2001-012319 A 1/2001

* cited by examiner

*Primary Examiner*—Weilun Lo
(74) *Attorney, Agent, or Firm*—Sughrue Mion, PLLC

(57) ABSTRACT

An apparatus for detecting fuel-vapor gas leaks that includes a jet pump (8) that introduces outside air into and pressurizes a vapor purge system including a fuel tank (1) by gasoline flow from a fuel pump (2); an internal pressure sensor (14) for measuring vapor purge system internal pressure, an open/close controllable reference orifice (21) that causes leakage through a reference leak hole; and a storage device for storing as an initial curve pressure changes during pressurization by the jet pump (8) for a predetermined time period, with the reference orifice (21) alone opened. The device can accurately detect leakage even while an internal combustion engine is running because it judges leak presence/absence by comparing a time series in a pressure curve obtained by jet pump (8) pressurization over the predetermined time period while idling with the vapor purge system completely shut-off, with a time series in the initial curve.

7 Claims, 8 Drawing Sheets

APPARATUS FOR DETECTING FUEL-VAPOR GAS LEAKS, AND VENT VALVE APPARATUS APPLIED TO THIS APPARATUS

BACKGROUND OF THE INVENTION

1. Field of the Invention

The present invention relates to apparatus for detecting fuel-vapor gas leaks in vehicle internal combustion engines.

2. Description of the Related Art

Conventional apparatus for detecting fuel-vapor gas leaks are disclosed in Japanese Laid-Open Patent Publication 2001-12319 and U.S. Pat. No. 6,112,728. Japanese Laid-Open Patent Publication 2001-12319 (pages 2–6, FIG. 1), for example, discloses a configuration for supplying pressurized air to a purge line and a fuel tank by means of an air pump, after an internal combustion engine is halted, and for judging a leakage amount according to the operating current of the air pump drive motor.

Since the conventional apparatus for detecting fuel-vapor gas leaks are configured for driving the air pump and supplying the pressurized air to the purge line and the fuel tank after the internal combustion engine is halted, and for judging the leakage amount according to the operating current of the air pump drive motor, the air pump, the drive motor and peripheral pipes are needed and the configuration is complex. Since internal pressure of the purge line and the fuel tank are indirectly measured according to the operating current of the air pump drive motor, there is a limit to the precision of the judgment. Moreover, it is necessary to operate the air pump until a predetermined internal pressure is obtained, since there are problems that battery will consume in the leak detection operation after the internal combustion engine is halted; and that unpleasant sounds are given by the leak detection air pump operation.

SUMMARY OF THE INVENTION

The present invention has been made in order to solve the above problems, and aims at providing a fuel-vapor gas leak detection device that can accurately detect leakage, even when an internal combustion engine is running.

A device for detecting fuel-vapor gas leaks in a preferred embodiment of the present invention comprises: a valve that can perform shut-off control of a vapor purge system that includes a canister connected to a fuel tank, an open/close controllable reference orifice that enables leakage from the vapor purge system through a reference leak hole, a jet pump for taking in outside air by gasoline flow from a fuel pump and for pressurizing the air, an internal pressure sensor for measuring internal pressure of the vapor purge system, and a storage device for storing as an initial curve time series pressure values, in a state with the reference orifice alone opened, in advance, and with pressurization by the jet pump carried out for a predetermined time period. The device for detecting fuel-vapor gas leaks performs during engine idle judgment of leak existence by comparing a pressure curve time series, obtained by the jet pump pressurizing over the predetermined time period in a state with the vapor purge system completely shut-off, with an initial curve time series.

Further, another preferred embodiment of the device for detecting fuel-vapor gas leaks comprises: a valve that can perform shut-off control of a vapor purge system that includes a canister connected to a fuel tank; an open/close controllable reference orifice that enables leakage through the canister from the fuel tank through a reference leak hole; a jet pump for taking in outside air by gasoline flow from a fuel pump, and pressurizing the inside of the fuel tank; an internal pressure sensor for detecting internal pressure of the fuel tank; a vent valve for shutting off the fuel tank from the canister by means of an outside signal; a control valve for open/close control of air flow to the canister and the jet pump; and a storage device for storing pressure values in a pressure-increase condition as an increasing pressure initial curve, when pressurizing by means of the jet pump over a first predetermined time period with the vent valve closed and the reference orifice opened, in advance, and for storing as a decreasing pressure initial curve, after halting the pressurization after the first predetermined time period has elapsed, time-series pressure values under a pressure-decrease condition due to leakage through the reference orifice, over a second predetermined time period. The device for detecting fuel-vapor gas leaks performs judgment of leak existence in the fuel tank side of the vapor purge system by comparing a time series in an increasing pressure curve obtained by pressurization by the jet pump with the fuel tank in a closed condition during idling, with a time series in the increasing pressure initial curve; and, judgement of leak existence in the canister side of the vapor purge system is performed, when an actual pressure value exceeds the pressure value of the increasing pressure initial curve at the first predetermined time, by halting the pressurization and comparing a time series in a decreasing pressure curve when the purge system is completely shut-off, with a time series in the decreasing pressure initial curve.

A vent valve device for the device for detecting fuel-vapor gas leaks in a preferred embodiment of the present invention comprises a vent valve that shuts off a fuel tank from a canister by the buoyancy of a float that rises with rising liquid surface level in the fuel tank, a control valve body that moves, according to a control signal from outside, in a direction in which a control valve that is connected to a jet pump, opens; and a linking member that pulls the vent valve so as to shut it off when the control valve body moves in its opening direction, wherein the linking member has an engagement configuration that prevents movement of the control valve body in its opening direction when the float rises with the liquid surface.

DETAILED DESCRIPTION OF THE PREFERRED EMBODIMENT

Embodiment 1

Figure 1:
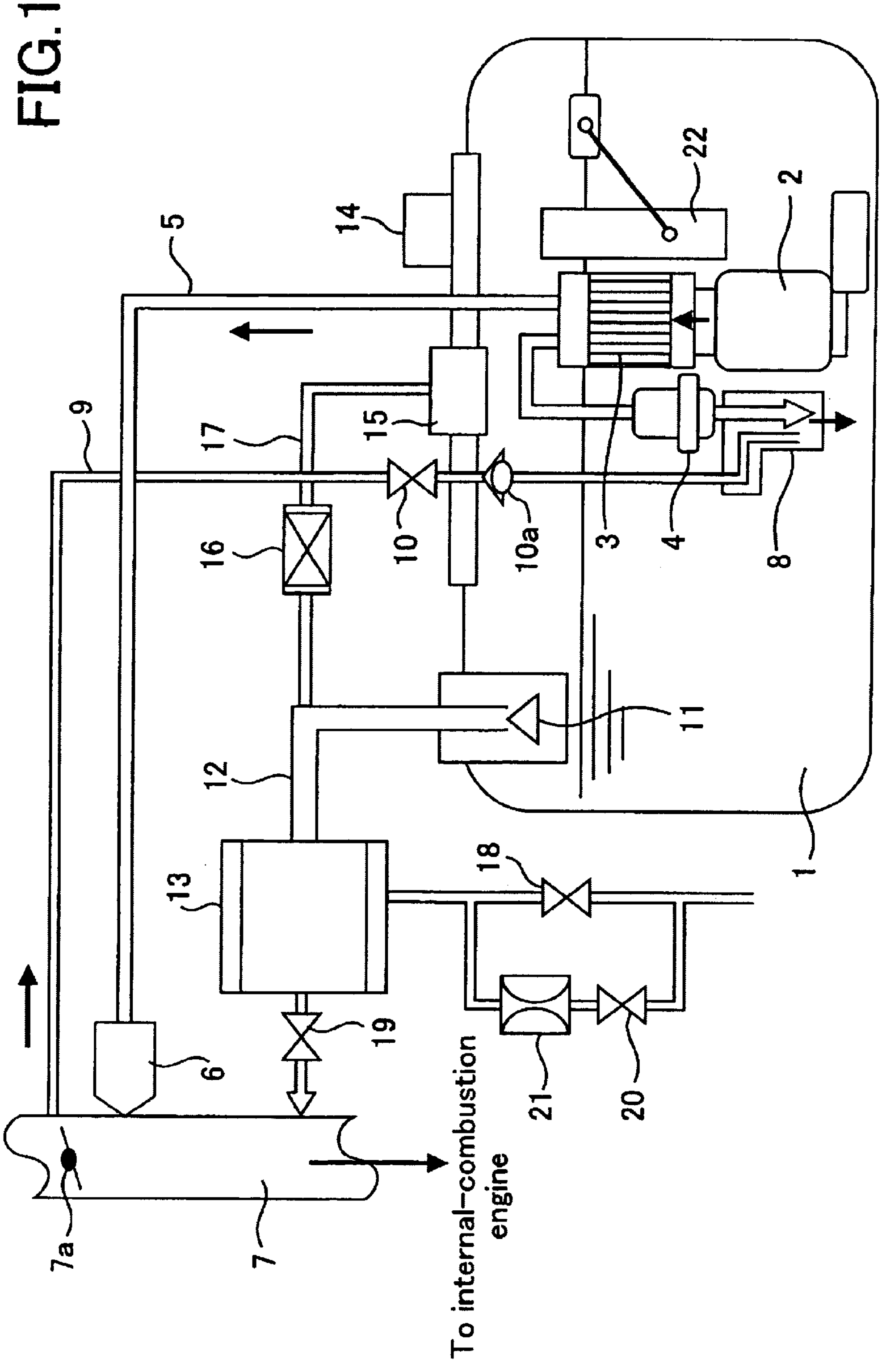
FIG. 1 is a block diagram of an apparatus for detecting fuel-vapor gas leaks according to Embodiment 1 of the invention.
Figure 2:
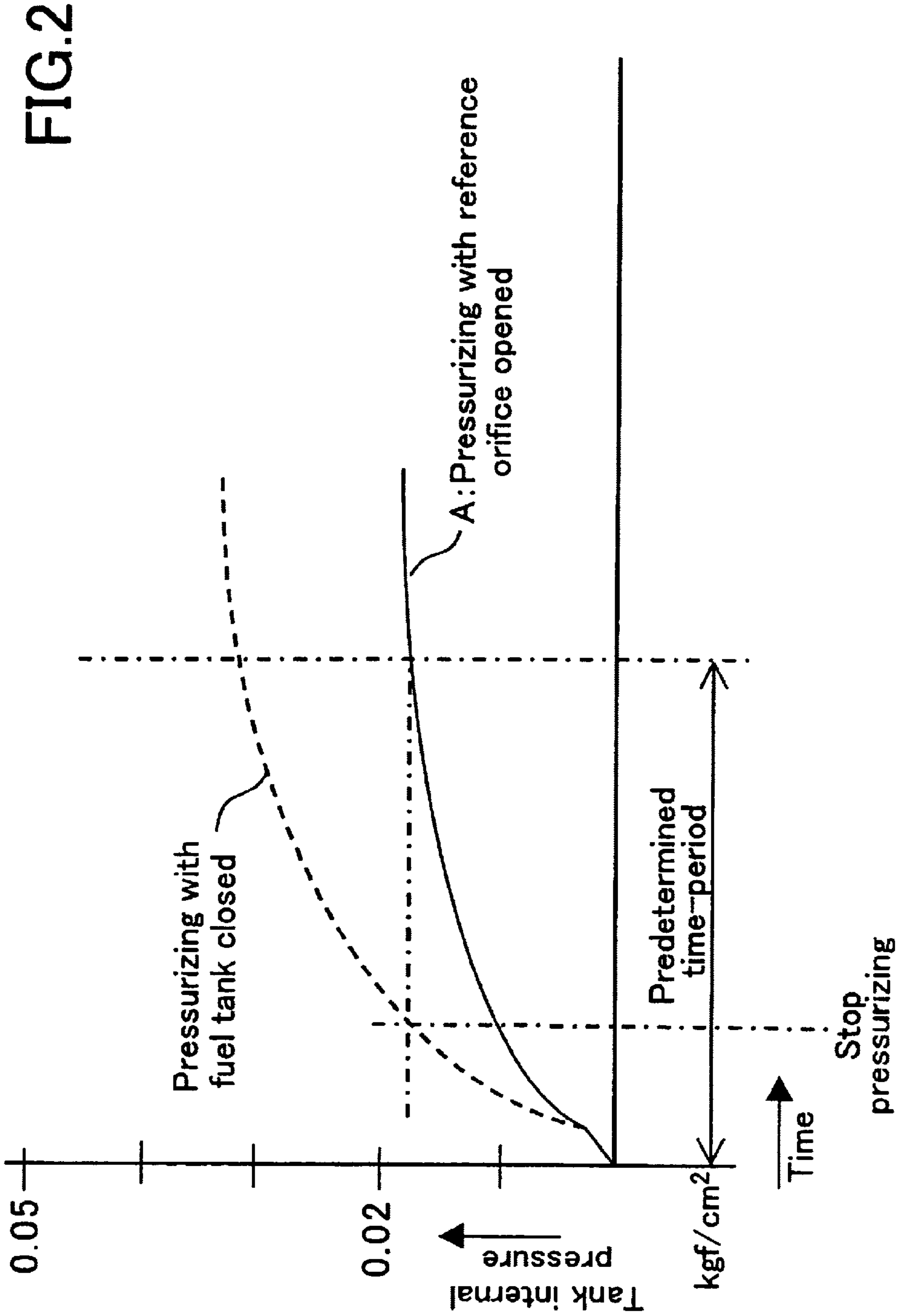
FIG. 2 illustrates an example of an initial curve according to Embodiment 1.
Figure 3:
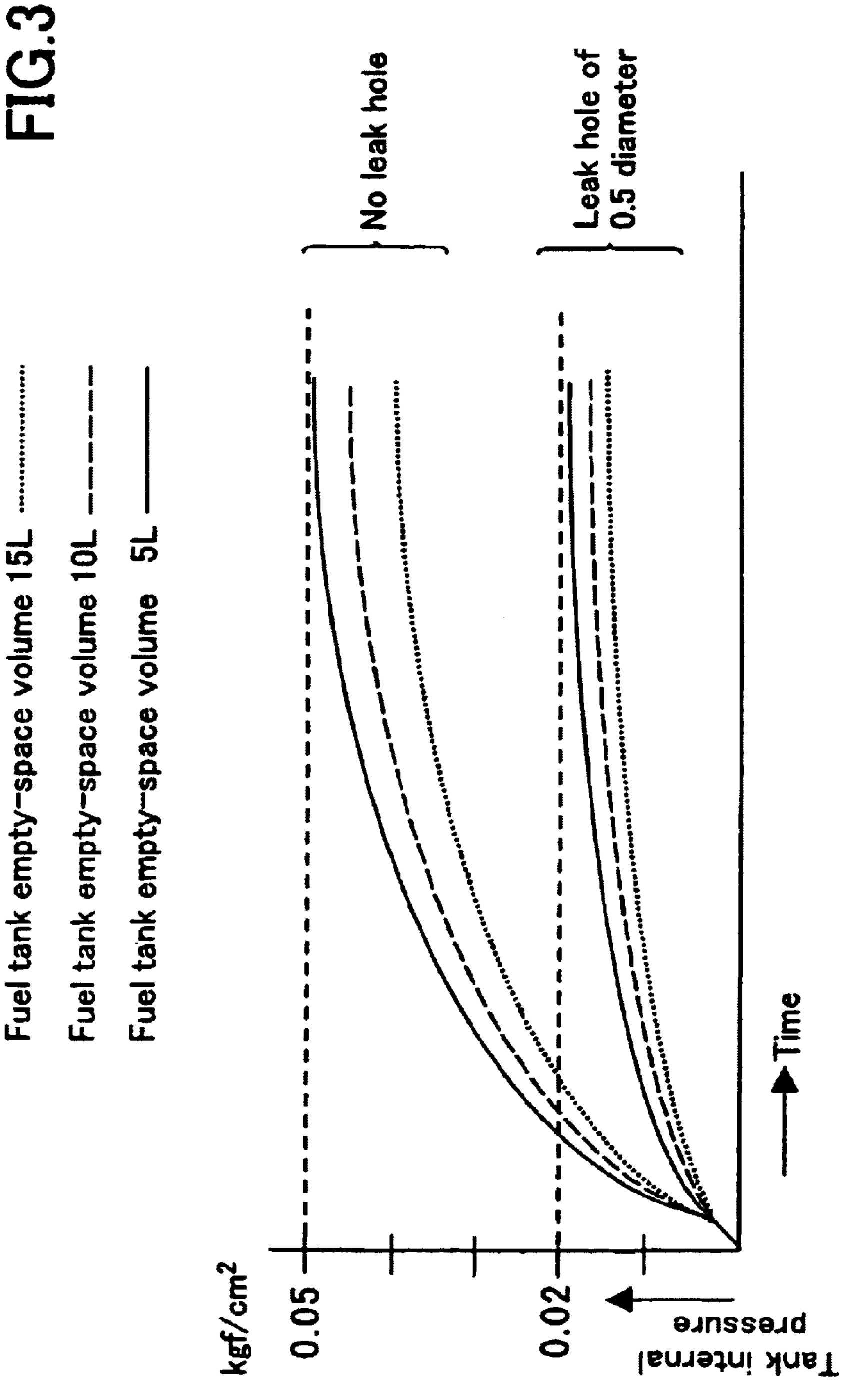
FIG. 3 is a graph illustrating, in leak detection according to Embodiment 1, how fuel tank internal pressure rises with and without the presence of a leak hole.

FIG. 1 is a block diagram of an apparatus for detecting fuel-vapor gas leaks according to Embodiment 1 of the invention; FIG. 2 illustrates an example of an initial curve according to Embodiment 1; and FIG. 3 is a graph illustrating how fuel tank internal pressure rises according to change in a fuel tank empty-space volume.

In FIG. 1, gasoline, which is fed from a submerged fuel pump 2 in the fuel tank 1, is filtered by a fuel filter 3; the gasoline pressure is regulated by a pressure regulator 4, and the gasoline is sent to an injector 6 through a fuel pipe 5; the gasoline is injected from the injector 6 to an intake-manifold 7 and is burned in an internal combustion engine. A jet pump 8, which serves as a jet pump for the fuel tank 1, is provided at an exhaust port of the pressure regulator 4, which branches off the fuel pipe 5. One end of an air-intake pipe 9 is connected to this jet pump 8, and the other end of the air-intake pipe 9 leads through a check-valve 10*a* and a control valve 10 to the open air on the upstream side of a slot valve 7*a* of the intake-manifold 7. When the control valve 10 is open, the jet pump 8 intakes air by venturi action through the gasoline flow, and increases the pressure in the fuel tank 1.

A vent valve 11 is arranged in the inner upper portion of the fuel tank 1, and is connected to a canister 13 through a vent pipe 12 from the vent valve 11. An internal pressure sensor 14 for measuring pressure difference between the inside of the fuel tank 1 and the atmosphere, and a roll-over valve 15, which closes in emergencies such as when the vehicle overturns, are mounted at levels at which they will not be immersed in the gasoline.

From the roll-over valve 15, a vapor gas pathway 17 extends to the canister 13 via a bi-directional valve 16, and is further connected from the canister 13 to the intake-manifold 7. Furthermore, a B-valve 19 is provided for opening and closing the connection between the intake-manifold 7 and the canister 13, and an A-valve 18 is provided for opening and closing the connection between the canister 13 and the atmosphere. The A-valve 18 and the B-valve 19 are opened and closed as needed so that the intake gas from the B-valve 19 will discharge gasoline vapor via the intake manifold 7 into the internal combustion engine, from a fuel-vapor purge system, adsorbed in the canister 13.

A bypass valve 20 and a reference orifice 21 which bypass the A-valve 18 are provided. The reference orifice 21 has a 0.5 mm reference leak hole. Further, a fuel level gauge 22 for detecting fuel liquid surface level is provided inside the fuel tank 1.

Moreover, the control valve 10, the A-valve 18, the B-valve 19, the bypass valve 20, the internal pressure sensor 14, and the fuel level gauge 22 are connected to a CPU of a fuel injection control device, and the CPU controls opening/closing of the valves and performs sensing through the internal pressure sensor 14 and the fuel level gauge 22.

With the apparatus for detecting fuel-vapor gas leaks configured in this way, it is desirable that the judgment as to whether there is a leak be made while the internal combustion engine is idling. The reason is that the control valve 10, which is usually closed and acts to prevent the function of the jet pump 8, is opened to activate the jet pump 8 during idling so that the gasoline from the fuel pump 2 is adjusted to a fixed pressure by the pressure regulator 4. Hence, although a part of the gasoline is fed to the internal combustion engine, a steady flow of most of the gasoline to the jet pump 8 via the pressure regulator 4 is ensured. Moreover, air supply from the slot valve 7*a* upstream is also steady, since the internal combustion engine consumes little combustion air. The internal pressure sensor 14 monitors pressure change conditions including pressurization inside the fuel tank 1 by the jet pump 8, and post-pressurization reduction in pressure, and a judgment is made as to whether there is a leak in the fuel-vapor purge system, which includes the fuel tank 1, and the system's associated components—the vent pipe 12, the canister 13, etc.

Leak judgment in Embodiment 1 will be now explained. First, initial processing is carried out for a newly built vehicle (a state in which there is no leak in the purge system). In FIG. 1, the A-valve 18 and the B-valve 19 are open, and the inside of the canister 13 is cleaned.

The bypass valve 20 and the control valve 10 are then opened; the fuel pump 2 is activated with the A-valve 18 and the B-valve 19 in a closed state; the jet pump 8 is operated by the gasoline flow from the fuel pump 2; and the fuel tank 1 pressurization is started. With elapse of time in this situation, increasing pressure curve A at one second intervals over a first predetermined time period T1 (15 seconds) is stored in CPU storage. Simultaneously, the values indicated by the fuel level gauge 22 in this situation, and temperatures in the fuel tank 1 according to a temperature sensor, which is not illustrated, are stored.

This means that the increased pressure condition is in a purge system in which the reference orifice 21 has the reference leak hole of 0.5 mm, and results in the increasing pressure curve A within the first predetermined time period T1. At the first predetermined time period T1, the fuel pump will be stopped and the operation of the jet pump 8 will be halted. This initial curve depends on characteristics of the type of fuel tank, performance of the jet pump, etc. of the vehicle equipped with the apparatus for detecting gas leaks.

For reference, a pressurization curve of the fuel tank when the bypass valve 20 is closed and the purge system is shut-off, is illustrated in FIG. 2.

FIG. 3 represents tank-internal increasing pressure curves obtained by experiment for different fuel tank empty-space volumes, and it illustrates how the increasing curves are influenced by the fuel tank empty-space volumes. A correction table is created from the relations, ascertained in advance from these results, between the indicated values of the fuel level gauge 22, and the fuel tank empty-space volumes, and is stored in the CPU storage beforehand.

By using the fuel tank empty-space volumes reverse-calculated from the indicated values of the fuel level gauge 22 and the output of the temperature sensor input into the fuel jet control device CPU, the increasing pressure curve in the initial processing is converted into the standard condition (a tank temperature of 30° C. when the tank empty-space volume is 15 liters) based on the correction table, and is stored in the CPU storage as an initial curve A.

Here, the fuel tank empty-space volumes are used, instead of the amount of remaining gasoline, so that there will be no effect due to differences in full tank volumes according to the fuel tank shape types.

Moreover, since a judgment is made using compensated conditions according to the correction table, which is stored in advance based on the indicated values of the fuel level gauge 22 and the temperatures, an accurate leak judgment is possible, irrespective of the remaining quantity of gasoline and the temperature.

It is desirable to store the initial curve A and the correction table in non-volatile memory in which storage retention is possible even when power is cut for battery exchange and similar situations.

Judgment as to the existence of a leak when the vehicle is moving is now explained. The leak detection is started when the status of a vehicle changes from moving to idling (for example, waiting for traffic signals).

First, to begin the leak judgment, the CPU opens the A-valve 18 and the B-valve 19, and cleans the inside of the canister 13. At this time, the indicated value of the fuel level gauge 22 and the temperature are taken in. Next, the A-valve 18 and the B-valve 19 are closed, the control valve 10 is opened, the jet pump 8 is operated by the gasoline flow from the fuel pump 2 during idling of the internal combustion engine, and the inside of the fuel tank 1 is pressurized.

With this judgement, the pressure rising state is measured with a lapse of time, and an increasing pressure curve is obtained by converting the values indicated by the fuel level gauge 22 and the temperatures into that in the standard state using the above-mentioned correction table. The pressure rising condition is compared with the pressure values of the initial curve A in a continuous set of points found by sampling at one second intervals in the same time that elapses while attaining the first predetermined time period T1.

Where the pressure value over the same time period from the start of pressurization until the predetermined time is reached, is less than the pressure value of the initial curve A, a "leak present in purge system" judgment is made; and where the pressure value is more than that of the initial curve A, a "purge system normal" judgment is made, and leak judgment terminates.

The speed of the pressure rise where the purge system, including the fuel tank and the canister 13, is closed and pressurized is much faster as compared to where there is a reference leak hole. Therefore, by making a "normal" judgment at the point in time where, from the start of pressurization, the pressure reaches what the pressure value of the initial curve A is at a predetermined point in time, and halting the pressurization, the time required for detecting that there is no leak can be shortened. When the leak judgment is finished, the control valve 10 is closed, the pressurization is stopped, the A-valve 18 and the B-valve 19 are opened, and the vehicle is made ready to run.

Moreover, if there is a change from idling to moving or if the internal combustion-engine is stopped before completing the leak judgment, the leak detection is stopped and will be carried out at the next idling opportunity. For this reason, by judging as "normal" at the point in time where, from the above-mentioned start of pressurization, the pressure reaches what the pressure value of the initial curve A is at the predetermined point in time, the time required for a judgment can be shortened.

In the apparatus for detecting fuel-vapor gas leaks in Embodiment 1, for a new vehicle in which there is a reference leak hole in the reference orifice 21, a pressurization curve over a predetermined time is stored as the initial curve characteristic of the vehicle. With the purge system, including the fuel tank 1 and the canister 13 closed off by the jet pump 8 when a vehicle is idling in actual use, judging whether there is a leak or not is made possible by comparing pressure transition during pressurization with the initial curve.

Embodiment 2

Figure 4:
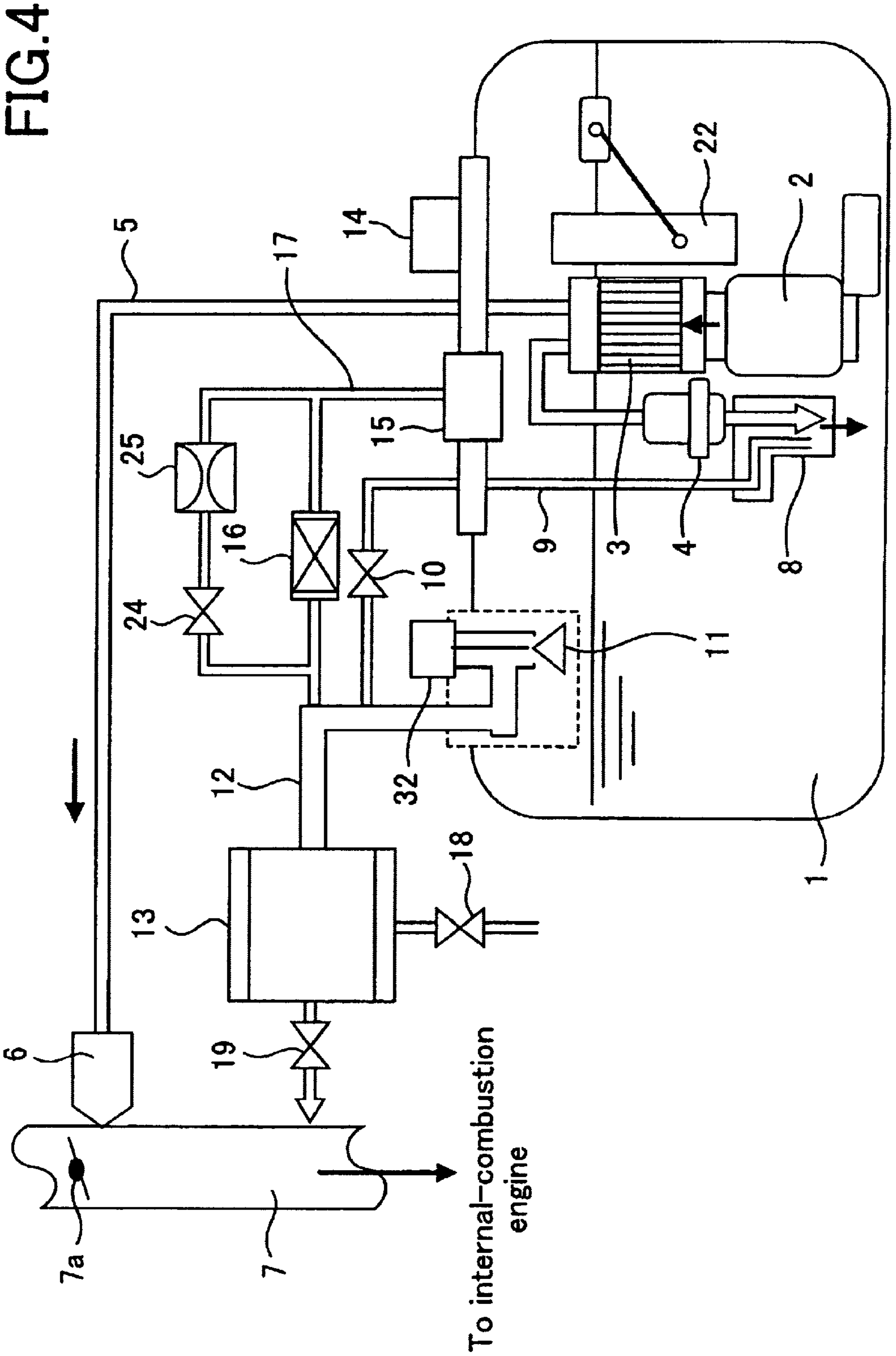
FIG. 4 is a block diagram of an apparatus for detecting fuel-vapor gas leaks according to Embodiment 2 of the invention.
Figure 5:
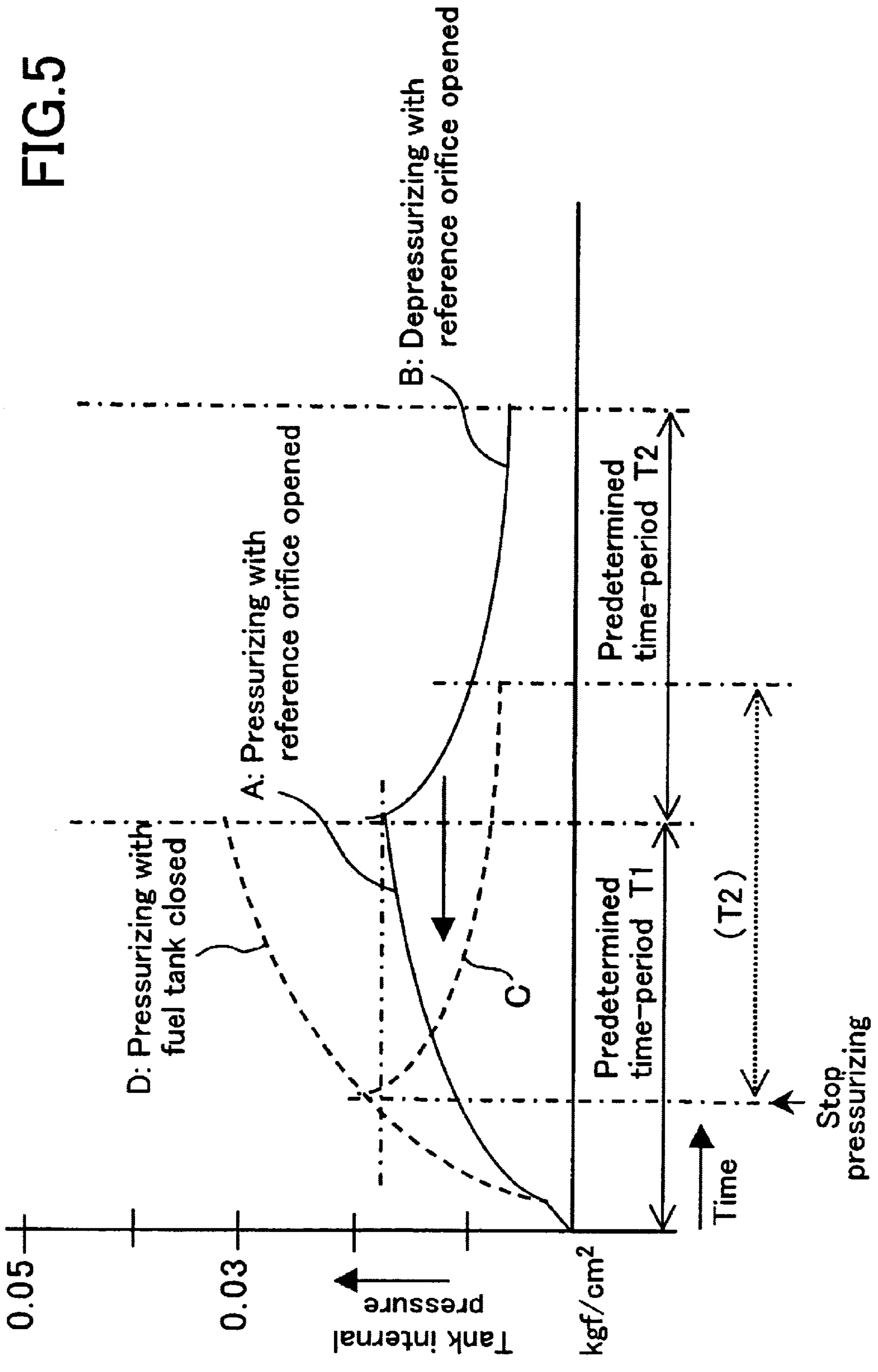
FIG. 5 illustrates an example of an initial curve according to Embodiment 2.

FIG. 4 is a block diagram of the apparatus for detecting fuel-vapor gas leaks of Embodiment 2 of the invention, and FIG. 5 illustrates an example of an initial curve according to Embodiment 2.

In FIG. 4, reference numerals that are the same as in Embodiment 1 refer to identical items. A bypass valve 24 and a reference orifice 25 are arranged to bypass the bi-direction valve 16 of the fuel-vapor gas pathway 17. The reference orifice 25 has a 0.5 mm reference leak hole. The other end of the air-intake pipe 9, which is connected to the jet pump 8, leads to the atmosphere via the canister 13 through the control valve 10. A solenoid 32 is provided on the vent valve 11, and open/close control of the fuel tank 1 and the vent pipe 12 is carried out by external signals to the solenoid 32.

The solenoid 32, the control valve 10, the A-valve 18, the B-valve 19, the bypass valve 24, the internal pressure sensor 14, and the fuel level gauge 22 are connected to the CPU of the fuel injection control device, and the CPU controls opening/closing of each valve and performs sensing through the internal pressure sensor 14 and the fuel level gauge 22.

Leak judgment in Embodiment 2 will now be explained. First, initial processing is carried out for a newly built vehicle, (in which a leak has not occurred in the purge system), and an initial curve illustrated in FIG. 5 is set up. The initial processing is carried with the ignition key turned on and the internal combustion-engine stopped. In FIG. 4, the A-valve 18 and the B-valve 19 are opened, and the inside of the canister 13 is cleaned. The fuel pump 2 is then activated with the bypass valve 24, the control valve 10, and the A-valve 18 opened, and the vent valve 11 and the B-valve 19 closed; the jet pump 8 is operated by the gasoline flow from the fuel pump 2; and the pressurization of the fuel tank 1 is started. The value indicated on the level gauge 22 in this situation, and the temperature at this time are stored in the CPU storage.

As shown in FIG. 5, as the pressure increases with time at one second intervals, the increasing pressure curve A for the first predetermined time period T1 (15 seconds) is stored in a time series in the CPU storage. This is the pressurization condition where the reference orifice 25 in the fuel tank 1 has a 0.5 mm reference leak hole. When the first predetermined time period T1 is reached, the fuel pump 2 is stopped, and the operation of the jet pump 8 is halted. Then after this pressurization, in a state where the reference leakage exists, a decreasing pressure curve B according to reference leakage through the reference orifice 25 during a second predetermined time T2 (15 seconds), is stored in the storage in a time series at one second intervals, the bypass valve 24 is closed, and initial processing is completed.

This initial curve is characteristic of the type of fuel tank, performance of the jet pump, etc. of the vehicle equipped with the apparatus for detecting gas leaks.

For reference, the pressurization state in the fuel tank when the bypass valve 24 is closed and the fuel tank is shut-off is illustrated by a curve D.

Since the pressurization and depressurization curves during initialization are influenced by the fuel tank empty-space volume and the temperature, with the correction table explained with FIG. 3 of Embodiment 1 being stored beforehand in the CPU storage, they are converted into those in the standard condition (a temperature of 30° C. with a fuel tank empty-space volume of 15 liters) from the correction table, wherein the fuel tank empty-space volume is reverse-calculated from the value indicated by the fuel level gauge 22 and the output of the temperature sensor is input to the CPU of the fuel injection control device, and they are stored in the CPU storage as initial curves.

It is desirable to store these initial curves in non-volatile memory in which storage retention is possible even when power is cut for battery exchange and or the like.

Judgment as to the existence of a leak when the vehicle is moving will now be explained. The leak detection is started when status of a vehicle changes from moving to idling (for example, waiting for traffic signals).

First, the CPU begins leak judgment by opening the A-valve 18 and the B-valve 19 to clean the inside of the canister 13. At this time, the value indicated by the fuel level gauge 22 and the temperature are taken in. Next, the B-valve 19 is closed, the control valve 10 is opened, the vent valve 11 is closed, the jet pump 8 is operated by the gasoline flow from the fuel pump 2 during idling of the internal combustion engine, and the inside of the fuel tank 1 is pressurized.

At this point, the pressure rise condition is measured as time progresses, and an increasing pressure curve is obtained by converting the values indicated by the fuel level gauge 22 and the temperatures into that of the standard state using the above-mentioned correction table. The pressure rise condition is compared with the time-series pressure values of the initial curve A, and is obtained by sampling at one second intervals over the same elapsed time before reaching the first predetermined time T1.

When any comparative pressure value over the same elapsed time period is less than the pressure values of the initial curve A, an alarm, "leak has occurred in fuel tank," is output. When the pressure value at a comparative point exceeds the initial curve A, the judgment is that "the fuel tank is normal," wherein the following procedure provided for reduction of the judgment time and for leak detection in the canister is enacted.

Where the pressure value over the identical elapsed time period from the start of pressurization until the first predetermined time does not reach the pressure value of the initial curve A, a judgment, "leak present in fuel tank," is made.

During pressurization with the vent valve 11 closed, at the point when, before the first predetermined time period T1 is reached, the pressure value of the initial curve A when the first predetermined time period T1 is reached is somewhat exceeded, a "fuel tank is normal" judgment is made, the pressurization is stopped, and the A-valve 18 is closed. With this stopping of the pressurization the control valve 10 is closed, the jet pump 8 operation is stopped, and at the same time the vent valve 11 is opened. At this time, since air containing gasoline vapor moves from the fuel tank 1 to the canister 13, the pressure decreases. This pressure decrease can be estimated from the empty-space volume that includes the tank 1 empty-space volume and the vent pipe 12, using the value indicated by the fuel level gauge 22 and the temperature; the pressure for deciding the stoppage of pressurization is set higher by that amount and is offset when the vent valve 11 is open.

Times and change in status of the pressure value as of the pressurization stoppage are stored in the storage device at one second intervals for the length of the second predetermined time period T2. The stored pressure variation is compared with, in FIG. 5, a curve C obtained by parallel shifting of initial curve B, and if equal or less than curve C, a "canister leak" alarm is given. If the pressure value exceeds curve C, a "canister is normal" judgment is made. This means that if the vent pipe 12 or the canister 13 has a 0.5 mm leak hole, the decreasing pressure curve will be the same as the initial curve B, and thus the judgment as to whether there is leak or not is made based on whether the actual measured value is above or below the initial curve C.

After completing the leak judgment, the control valve 10 is closed, the A-valve 18 and the B-valve 19 are opened, and the vehicle is ready for running.

The above describes how each initial curve and actual measurement are compared and judged by using pressure values calculated under standard conditions from the correction table obtained from the temperature and the value indicated by the fuel level gauge 22 during initialization or actual measurement.

In the case of the pressure rise from the start of the pressurization in a leak-detection judgment is, for example, as in curve D, when an actual pressure value exceeds the pressure value at the first predetermined time T1 of the initial curve A, it is judged to be normal, and the time required for detecting that there is no leakage can be shortened by stopping pressurization.

Moreover, in comparing the initial curve C during depressurization with the actual measured value, if the pressure values at three one-second intervals after an initial period of instability (for example, 5 seconds) has passed, all exceed the initial curve values in a corresponding identical elapsed time period, a "normal" judgment will be made, and the time needed for removing irregular values in the actual measurement and for detecting whether there is a leak or not, can be shortened.

Since the leak detection judgment is not possible when the vent valve 11 is closed by the liquid surface in a full tank, whether leak detection is possible is sensed from the value of the fuel level gauge 22 indicating that the liquid level is such that the vent valve 11 is open.

If the vehicle status changes from idling to moving or if the internal combustion-engine is stopped before completing the leak judgment, the leak detection is stopped and will be carried out at the next idling opportunity.

With Embodiment 2 of the apparatus for detecting fuel-vapor gas leaks, the pressurization curve over the first predetermined time period for a new vehicle having the reference leak hole in the reference orifice 21, and the depressurization curve, over the second predetermined time period from the start of pressurization to the state when the pressurization is stopped, are stored as initial curves characteristic of the vehicle, and by comparing pressure transition when being pressurized with the tank 1 closed by the jet pump 8 during idling, with the initial pressurizing curve, a judgment can be made as to whether the fuel tank 1 has a leak or not, and by comparing the depressurization curve when the vapor purge system including the canister 13 is closed in the pressurized state, with the depressurizing initial curve, a judgment can be made as to whether the canister 13 has a leak or not.

Embodiment 3

Figure 6:
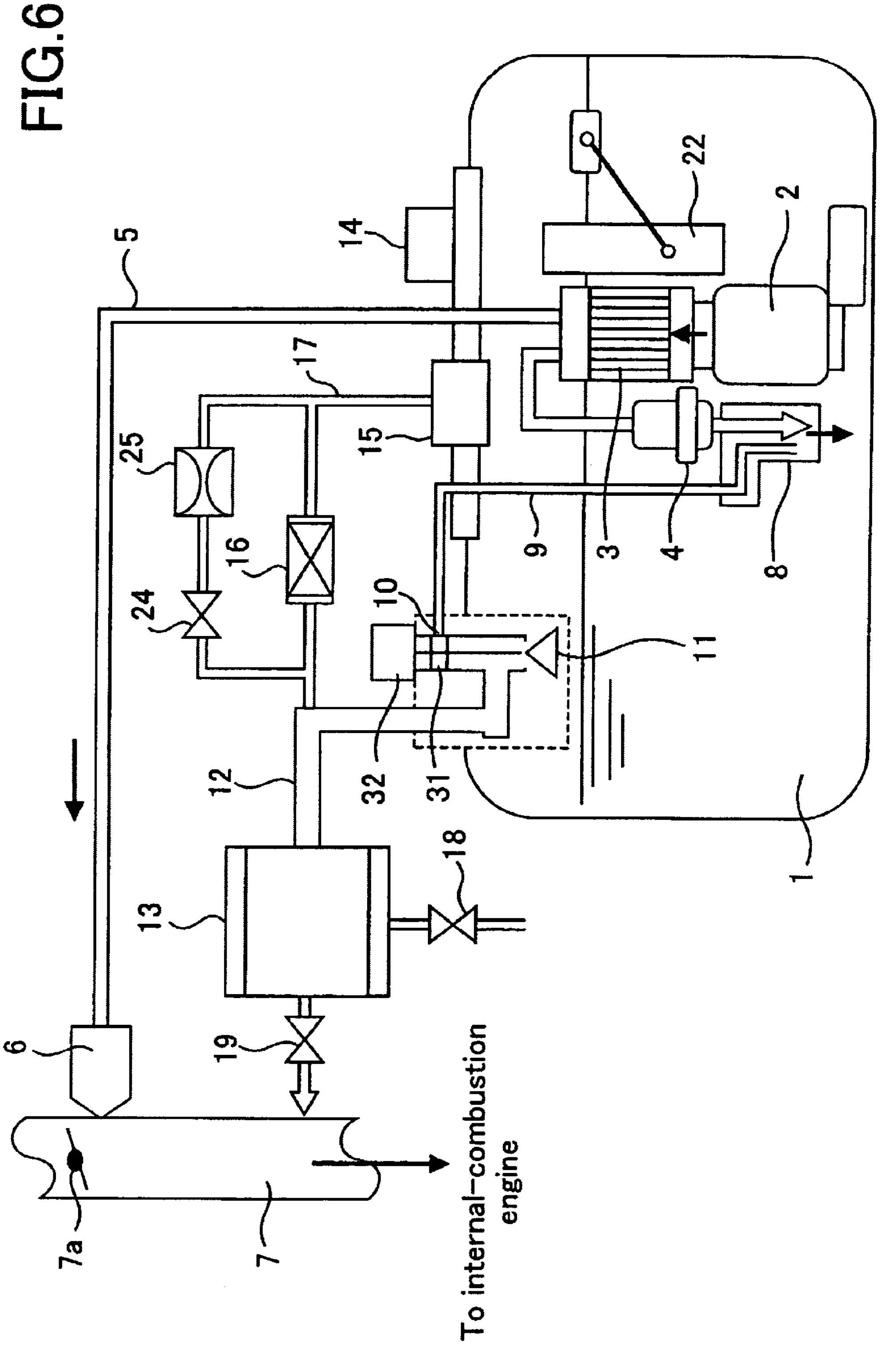
FIG. 6 is a block diagram of an apparatus for detecting fuel-vapor gas leaks according to Embodiment 3 of the invention.
Figure 7:
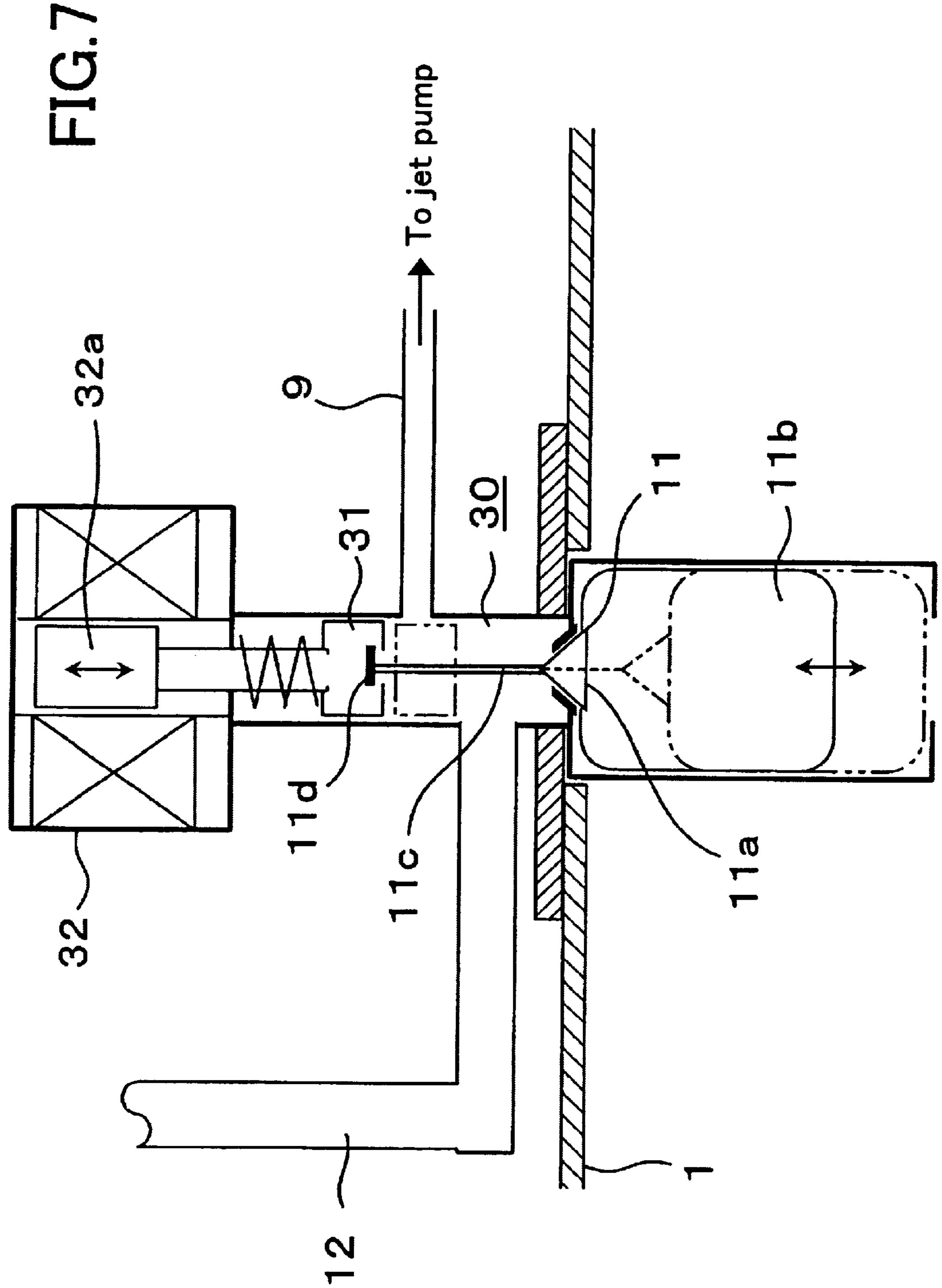
FIG. 7 is a block diagram of a vent valve device according to Embodiment 3.

FIG. 6 is a block diagram of the apparatus for detecting fuel-vapor gas leaks of Embodiment 3 of the invention, and FIG. 7 illustrates a configuration of a vent valve device for Embodiment 3. In FIG. 6, reference numerals that are the same as in Embodiment 1 refer to identical items.

The vent valve 11, the control valve 10, a control valve body 31, and the solenoid 32, etc., are arranged as a unit in a vent valve device 30. The end of the intake gas pipe 9 that extends to the jet pump 8 is connected to the control valve 10 of vent valve device 30. The control valve 10 leads to the external atmosphere via the vent pipe 12 and the canister 13, and the control valve body 31 is driven by an external signal to the solenoid 32 to control the opening/closing to operate the control valve 10.

The vent valve device 30 will be explained here. In FIG. 7, the vent valve 11 is arranged so that a stopcock 11*a* operates together with a float 11*b*, and the stopcock 11*a* shuts off the fuel tank 1 from the vent pipe 12 with the surface of the liquid rising. Moreover, a linking member 11*c* is extended to the upper part of the float 11*b*. A connecting part 11*d* is arranged at the upper end of the linking member 11*c*, and is connected to the control valve body 31. The control valve body 31 is composed of a piston valve, and when the liquid surface in the fuel tank 1 is low and the solenoid 32 is not excited, it is positioned on the double-dotted dashed line in the figure and closes the intake gas pipe 9 that communicates with the jet pump 8.

When the control valve body 31 is moved upwards by suction of a plunger 32*a*, the intake gas valve 9 is opened, the stopcock 11*a* is moved upwards, and the vent valve 11 is closed off. If the liquid surface rises when the solenoid 32 is not excited, the vent valve 11 will be closed off by the rise of the float 11*b*; however, because the connecting part 11*d* can be moved irrespective of the control valve body 31, the intake gas valve 9 stays closed.

The solenoid 32, the A-valve 18, the B-valve 19, the bypass valve 24, the internal pressure sensor 14, and the fuel level gauge 22 are connected to the CPU of the fuel injection control device, and the CPU performs open/close control of each valve and sensing through the internal pressure sensor 14 and the fuel level gauge 22.

With the control valve 10 of Embodiment 2 being rendered the control valve body 31, which is open-/close-controlled contrariwise to the vent valve 11 of the vent valve device 30, the leak judgment of Embodiment 3 has the same judgment procedure as Embodiment 2, and consequently explanation thereof is omitted here.

In Embodiment 3, since the vent valve 11 and the control valve 10 are configured as one unit in the vent valve device 30, the apparatus for detecting gas leaks and control can be simplified.

Figure 8:
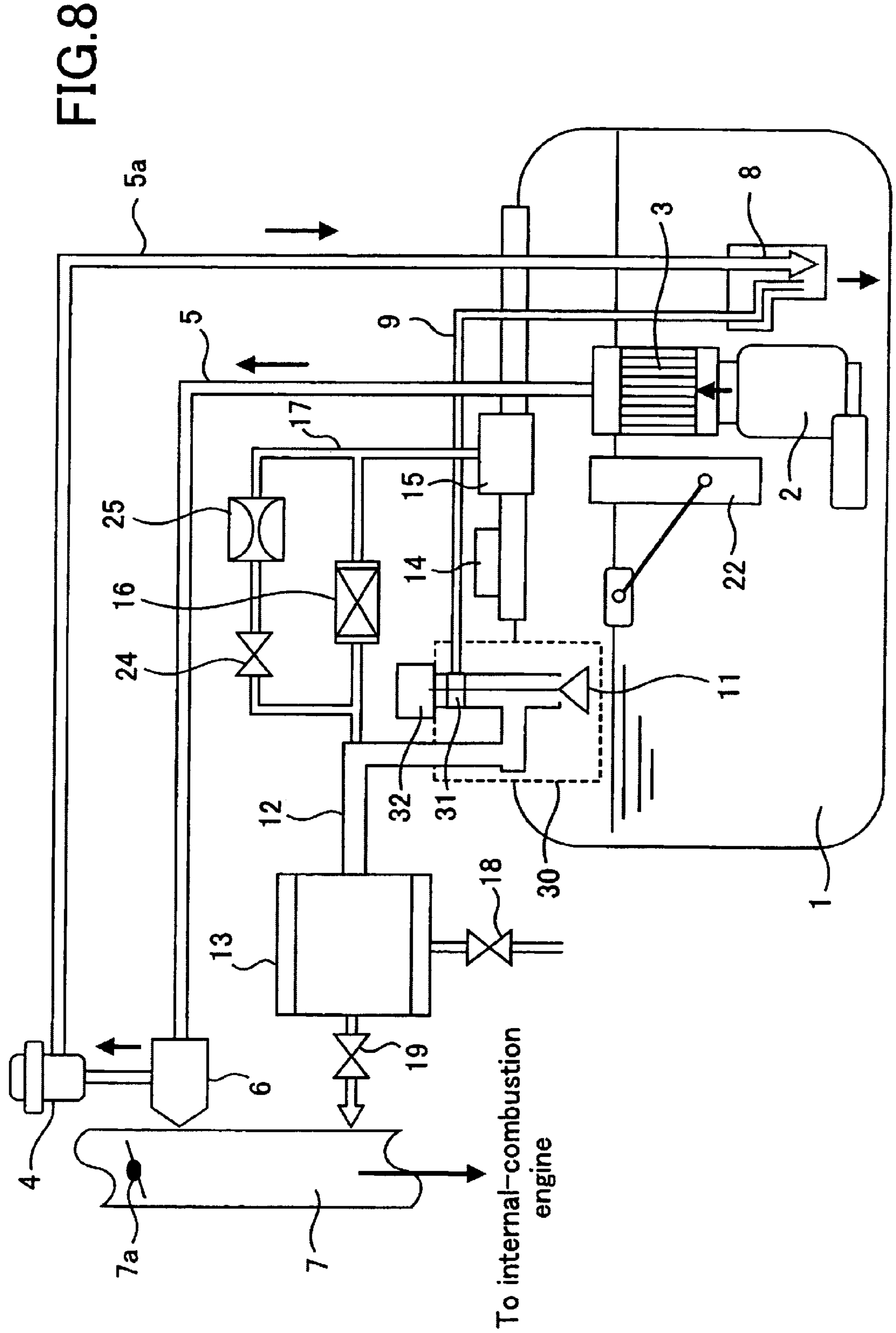
FIG. 8 is a block diagram of an apparatus for detecting fuel-vapor gas leaks, illustrating another embodiment of the invention.

FIG. 8 is a block diagram of an apparatus for detecting fuel-vapor gas leaks illustrating another embodiment of the invention; surplus gasoline returned through a return pipe 5*a* from the injector 6 is supplied to the jet pump 8, and the leak detection judging is the same as in each of the above embodiments.

As explained above, in the apparatus for detecting fuel-vapor gas leaks of Embodiment 1 of this invention, the pressurization curve for the new vehicle having the reference leak hole in the reference orifice 21 is stored as an initial curve characteristic of the vehicle, and by comparing the initial curve with the pressure transition under pressurization, when the purge system, including the fuel tank 1 and the canister 13, is closed by the jet pump 8, a judgment is made as to whether there is a leak in the purge system when the vehicle is idling.

In the apparatus for detecting fuel-vapor gas leaks in embodiment 2, the pressurization curve over the first predetermined time period when there is a reference leak hole in the reference orifice 21 in a new vehicle, and the depressurization curve, over the second predetermined time period from a state when the pressurization is stopped, are stored as initial curves characteristic of the vehicle; the judgment as to whether there is a leak in the fuel tank 1 can be made by comparing pressure transition when being pressurized with the fuel tank 1 closed by the jet pump 8, with the pressurization initial curve and a judgment as to whether there is a leak in the canister 13 can be made while idling by comparing the depressurization initial curve with depressurizing curve when the fuel purge system, including the canister 13, in the pressurized state is closed.

Further, this invention is not limited to the above-described embodiments, and the form may be freely changed within the bounds of the invention and free modification within the range of the sprit of the invention is possible.

What is claimed is:

1. An apparatus for detecting fuel-vapor gas leaks, comprising:

a valve for performing shut-off control of a vapor purge system that includes a canister that connects a fuel tank to an internal combustion engine;

an open/close controllable reference orifice having a reference leak hole, said reference orifice for causing leakage from the vapor purge system through the reference leak hole;

a jet pump for introducing outside air to the vapor purge system and for pressurizing the vapor purge system, by gasoline flow from a submerged fuel pump in the fuel tank;

an internal pressure sensor for measuring internal pressure of the vapor purge system; and a storage device for storing as an initial curve, in a time series, pressure values taken by the internal pressure sensor in a state with the reference orifice alone opened and with pressurization from the jet pump carried out for a predetermined time period; wherein by comparing a time series in a pressure curve obtained by the jet pump pressurizing the vapor purge system in a completely shut-off state over the predetermined time period, with the time series in the initial curve, when the pressure curve is lower than the initial curve, the device for detecting fuel-vapor gas leaks judges that a leak is present.

2. An apparatus for detecting fuel-vapor gas leaks as recited in claim 1, wherein judgment of no leakage and normal condition is performed, and the leak detection is terminated, at a point in time when the pressure curve from the start of leak detection exceeds the pressure values of the initial curve when the predetermined time period has elapsed.

3. An apparatus for detecting fuel-vapor gas leaks, comprising:

a valve for performing shut-off control of a vapor purge system that includes a canister that connects a fuel tank to an internal combustion engine;

an open/close controllable reference orifice having a reference leak hole, said reference orifice for causing leakage from the vapor purge system through the reference leak hole;

a jet pump for introducing outside air to the vapor purge system and for pressurizing the vapor purge system by gasoline flow from a submerged fuel pump in the fuel tank;

an internal pressure sensor for detecting the internal pressure of the fuel tank;

a vent valve arranged between the fuel tank and the canister, for shutting off the fuel tank from the canister according to an external signal;

a control valve for open/close control of air flow to the canister and the jet pump; and a storage device for storing pressure values, in an increasing pressure condition as an increasing pressure initial curve, during pressurization by the jet pump over a first predetermined time period with the vent valve closed and the reference orifice opened and for storing as a decreasing pressure initial curve, after halting the pressurization after the first predetermined time period has elapsed, pressure values under a decreasing pressure condition by means of leakage through the reference orifice, in a time series over a second predetermined time period; wherein judgement of leak existence in the fuel tank side of the vapor purge system is performed by comparing a time series in an increasing pressure curve obtained by the jet pump pressurizing the fuel tank in a closed condition, with the time series in the increasing pressure initial curve; and judgement of leak existence in the canister side of the vapor purge system is performed, when an actual pressure value exceeds the pressure value of the increasing pressure initial curve at the first predetermined time, by halting the pressurization and comparing a time series in a decreasing pressure curve with the purge system being completely shut-off, with the time series in the decreasing pressure initial curve.

4. An apparatus for detecting fuel-vapor gas leaks as recited in claim 3, wherein:

the vent valve, which is arranged between the fuel tank and the canister and enables shutting off the fuel tank from the canister according to a control signal, and the control valve, which performs open/close control of air flow from the canister to the jet pump, are provided as one unit in a vent valve device; and the vent valve and the control valve are opened and closed contrariwise by the control signal.

5. An apparatus for detecting fuel-vapor gas leaks as recited in claim 1, further comprising a fuel level gauge in the fuel tank, wherein the pressure values are corrected from liquid surface information found by the fuel level gauge and judgment is made as to whether a leak is present.

6. An apparatus for detecting fuel-vapor gas leaks as recited in claim 3, further comprising a fuel level gauge in the fuel tank, wherein the pressure values are corrected from liquid surface information found by the fuel level gauge and judgment is made as to whether a leak is present.

7. A vent valve device in an apparatus for detecting fuel-vapor gas leaks, comprising:

a vent valve for shutting off a fuel tank from a canister by buoyancy of a float that rises with rising liquid surface level in the fuel tank;

a control valve body for moving, according to a control signal from outside, in a direction in which a control valve, which communicates with a jet pump, opens; and a linking member that pulls the vent valve so as to shut it off when the control valve body moves in its opening direction, wherein the linking member has an engagement structure for not letting the control valve body move in its opening direction with the float rising with the liquid surface.

* * * * *